United States Patent
Lee

(10) Patent No.: US 9,235,290 B2
(45) Date of Patent: Jan. 12, 2016

(54) METHOD AND APPARATUS FOR CONTROLLING IMAGING AREA OF FLEXIBLE DISPLAY DEVICE

(71) Applicant: Samsung Display Co., Ltd., Yongin, Gyeonggi-Do (KR)

(72) Inventor: Wook-Jae Lee, Yongin (KR)

(73) Assignee: Samsung Display Co., Ltd., Samsung-ro, Giheung-Gu, Yongin-si, Gyeonggi-Do (KR)

(*) Notice: Subject to any disclaimer, the term of this patent is extended or adjusted under 35 U.S.C. 154(b) by 170 days.

(21) Appl. No.: 13/789,051

(22) Filed: Mar. 7, 2013

(65) Prior Publication Data

US 2014/0125604 A1 May 8, 2014

(30) Foreign Application Priority Data

Nov. 7, 2012 (KR) .......................... 10-2012-0125699

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01); *G06F 2203/04102* (2013.01); *G06F 2203/04803* (2013.01)

(58) Field of Classification Search
CPC .............. G09G 2380/02; G06F 1/1652; G06F 2203/04102; G06F 3/04886; G06F 3/0416; G06F 3/04883
USPC .................................................. 345/156–184
See application file for complete search history.

(56) References Cited

U.S. PATENT DOCUMENTS

| | | | | |
|---|---|---|---|---|
| 8,228,414 B2* | 7/2012 | Cho | ................... | H04N 5/23293 348/333.11 |
| 2008/0303782 A1* | 12/2008 | Grant | ................... | G06F 1/1615 345/156 |
| 2010/0045705 A1* | 2/2010 | Vertegaal | ........... | A47G 19/2227 345/661 |
| 2011/0107272 A1* | 5/2011 | Aguilar | ............... | G06F 3/04815 715/853 |
| 2012/0032979 A1* | 2/2012 | Blow | ................... | G06F 1/1626 345/647 |
| 2012/0050314 A1 | 3/2012 | Wang | | |
| 2013/0176232 A1* | 7/2013 | Waeller | ................. | B60K 35/00 345/173 |
| 2013/0285922 A1* | 10/2013 | Alberth, Jr. | .......... | G06F 1/1694 345/173 |
| 2014/0213360 A1* | 7/2014 | Takagi | ................... | A63F 13/00 463/31 |

FOREIGN PATENT DOCUMENTS

| | | | |
|---|---|---|---|
| JP | 2006040050 A | * | 2/2006 |
| KR | 1020090043781 A | | 5/2009 |
| KR | 1020110124745 A | | 11/2011 |
| KR | 1020120047612 A | | 5/2012 |

* cited by examiner

*Primary Examiner* — Amare Mengistu
*Assistant Examiner* — Jennifer Zubajlo
(74) *Attorney, Agent, or Firm* — Robert E. Bushnell, Esq.

(57) ABSTRACT

Provided are a method and apparatus for controlling an imaging area of a flexible display device. A method of controlling an imaging area in a display area of a flexible display device including a display unit for receiving a touch, and a display area overlapping the display unit and for displaying an image includes obtaining at least two input signals input to the display unit in response to a continuous touch in the form of a closed loop, setting an internal area of the closed loop as an imaging area based on the obtained at least two input signals, and controlling the image displayed on the display area to be moved and displayed onto the set imaging area. An area for displaying an image may be controlled appropriately for the shape of a flexible display device by using an input signal generated by a user's touch.

19 Claims, 8 Drawing Sheets

METHOD AND APPARATUS FOR CONTROLLING IMAGING AREA OF FLEXIBLE DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 7 Nov. 2012 and there duly assigned Serial No. 10-2012-0125699.

BACKGROUND OF THE INVENTION

1. Field of the Invention

Embodiments of the present invention relate to a method and apparatus for controlling an imaging area of a flexible display device, and more particularly, to a method and apparatus for controlling an imaging area of a flexible display device that is transformed to a different shape.

2. Description of the Related Art

Recently, with the development of display devices, flexible display devices that may be folded or rolled have been researched and developed.

Due to excellent characteristics related to viewing angle, contrast, response speed, power consumption, etc., organic light emitting display panels expand their application fields from personal portable devices, e.g., MP3 players and mobile phones, to televisions (TVs). Also, due to self-emissive characteristics, organic light emitting display panels do not need additional light sources and thus may reduce their thicknesses and weights.

An organic light emitting display panel may be formed to be flexible by using a plastic substrate, and its flexibility may be further increased by reducing its thickness. A flexible display device may be used in a planar shape or may be used in a three-dimensional shape as an advantage of its flexibility. The three-dimensional shape of a flexible display device may vary according to a user or a situation where the flexible display device is used.

In order to control an area for displaying an image in a display area of a flexible display device transformed to a three-dimensional shape, a control method different from that used to control a flat display device is required.

SUMMARY OF THE INVENTION

Embodiments of the present invention provide a method and apparatus for controlling an imaging area of a flexible display device.

Additional aspects, features, and advantages of the present invention will become apparent from the following detailed description of the invention, the accompanying drawings, and the appended claims.

According to an aspect of the present invention, there is provided a method of controlling an imaging area in a display area of a flexible display device including a display unit for receiving a touch, and a display area overlapping the display unit and for displaying an image. The method includes obtaining at least two input signals input to the display unit due to a continuous touch in the form of a closed loop in order to set the imaging area, setting an internal area of the closed loop as the imaging area based on the obtained at least two input signals, and controlling the image displayed on the display area to be moved and displayed onto the set imaging area.

According to another aspect of the present invention, there is provided a computer readable recording medium having recorded thereon a computer program for executing the above method.

According to another aspect of the present invention, there is provided an apparatus for controlling an imaging area in a display area of a flexible display device including a display unit for receiving a touch, and a display area overlapping the display unit and for displaying an image. The apparatus includes a signal obtaining unit for obtaining at least two input signals input to the display unit due to a continuous touch in the form of a closed loop in order to set the imaging area, an imaging area setting unit for setting an internal area of the closed loop as the imaging area based on the obtained at least two input signals, and a display control unit for controlling the image displayed on the display area to be moved and displayed onto the set imaging area.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
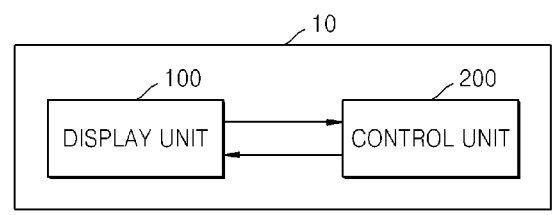
FIG. 1 is a block diagram of a flexible display device constructed as an embodiment according to the principles of the present invention.

Hereinafter, the present invention will be described in detail by explaining embodiments of the invention with reference to the attached drawings. The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

In the drawings, the thicknesses of layers and regions are exaggerated for clarity, and like reference numerals denote like elements.

Meanwhile, the terminology used herein is for the purpose of describing particular embodiments and is not intended to limit the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Also, it will be understood that, although the terms first, second, etc. may be used herein to describe various elements, these elements should not be limited by these terms. These terms are only used to distinguish one element from another.

FIG. 1 is a block diagram of a flexible display device 10 constructed as an embodiment according to the principles of the present invention. Referring to FIG. 1, the flexible display device 10 may include a display unit 100 for receiving a touch and including a display area for displaying an image, and a control unit 200 for controlling an imaging area in the display area based on an input signal input to the display unit 100 in response to a user's touch.

Since the flexible display device 10 has flexibility and thus may be folded or rolled, it may be easily stored and carried, and may be transformed according to its operating environment or a user's desire. As such, an image appropriate for the transformed shape or a user interface for controlling the transformed flexible display device 10 may be provided thereon.

The display unit 100 of the flexible display device 10 may be, but not limited to, an organic light-emitting display panel, a liquid crystal display panel, etc. Also, the organic light-emitting display panel is not limited to a top emission type, and may be a bottom emission type or a dual emission type.

Figure 2:
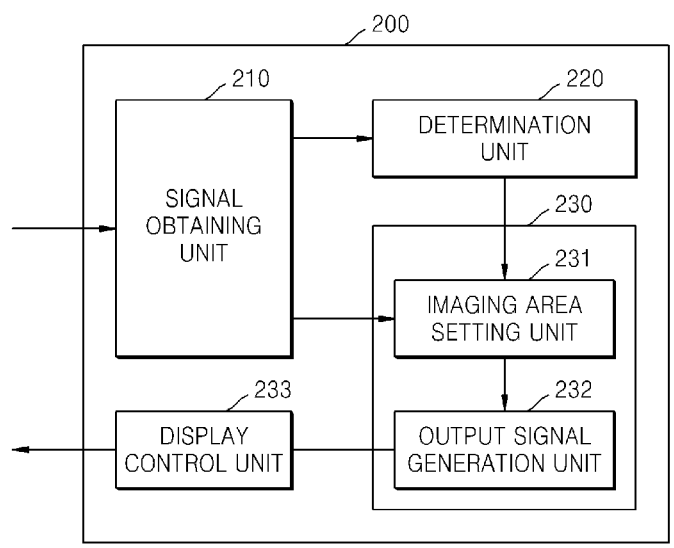
FIG. 2 is a block diagram of a control unit illustrated in FIG. 1.

FIG. 2 is a block diagram of the control unit 200 illustrated in FIG. 1. Referring to FIG. 2, the control unit 200 may include a signal obtaining unit 210, a determination unit 220, and an imaging area control unit 230.

The signal obtaining unit 210 obtains at least two input signals input to the display unit 100 in response to a continuous touch in the form of a closed loop in order to set an imaging area. Here, the at least two input signals may include a first input signal and a second input signal.

The flexible display device 10 may be transformed to a spiral structure, and the at least two input signals may be continuously input to the display unit 100 while the flexible display device 10 is transformed to a spiral structure. As such, the at least two input signals may form one closed loop on the flexible display device 10 transformed to a spiral structure.

Figure 3:
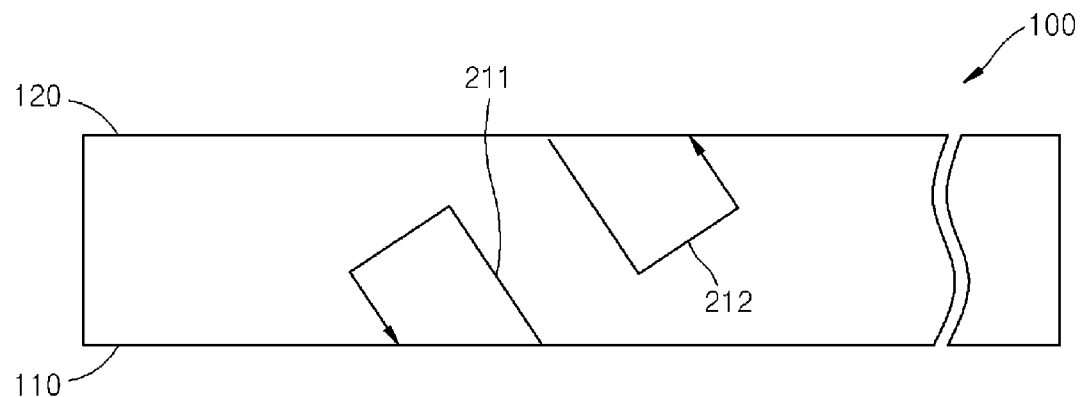
FIG. 3 is a diagram showing first and second input signals input to a display unit illustrated in FIG. 1.

FIG. 3 is a diagram showing first and second input signals 211 and 212 input to the display unit 100 illustrated in FIG. 1. Referring to FIG. 3, the signal obtaining unit 210 may obtain the first and second input signals 211 and 212 input to the display unit 100 in response to a continuous touch in order to set an imaging area.

Figure 4:
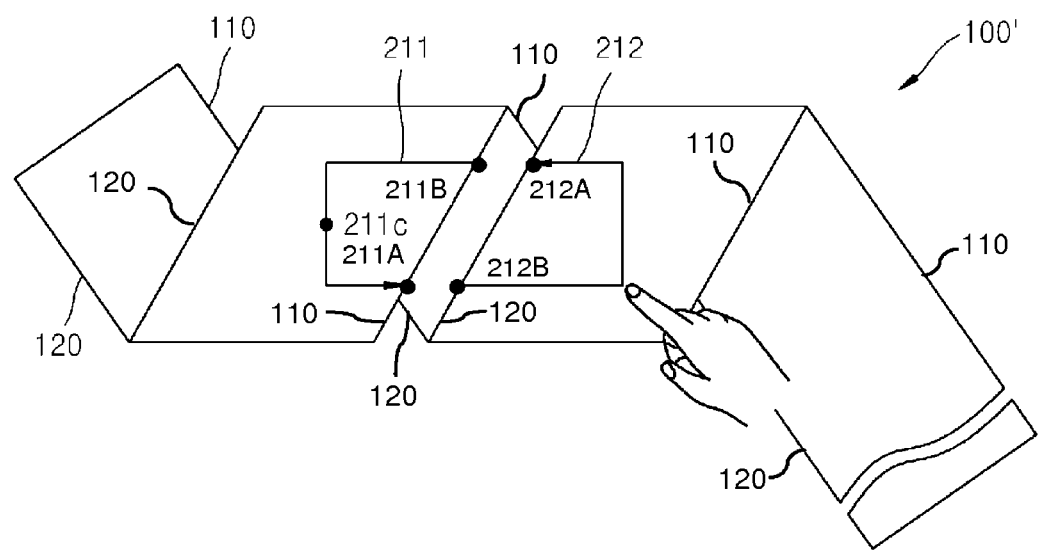
FIG. 4 is a diagram showing the first and second input signals input to a modified display unit.

FIG. 4 is a diagram showing the first and second input signals 211 and 212 input to a modified display unit 100'. Referring to FIG. 4, the flexible display device 10 may be transformed to a spiral structure. The first and second input signals 211 and 212 may be continuously input in response to a continuous touch on the modified display unit 100'. As such, the first and second input signals 211 and 212 may form one closed loop on the modified display unit 100' in a spiral structure.

Although the flexible display device 10 is transformed to a spiral structure in FIG. 4, the flexible display device 10 is not limited to the above transformation structure and may be transformed to various three-dimensional structures according to different circumstances. As such, a user may input a plurality of input signals to form one closed loop on the modified display unit 100' in various three-dimensional structures.

In order to input at least two input signals for forming a closed loop, the user may perform dragging on one surface of the display unit 100. If the user performs dragging on one surface of the display unit 100, curved line information corresponding to a path of the dragging may be generated. Here, dragging refers to an input method for starting an input at one point and ending the input at another point, and a drag input may be a continuous input.

Each of the first and second input signals 211 and 212 may be input as a single drag signal or a plurality of drag signals. For example, if continuous dragging of the user starts at an intermediate point 211C of the first input signal 211, continued to input the second input signal 212, and then returns to the intermediate point 211C of the first input signal 211, the first and second input signals 211 and 212 for forming a closed loop on the modified display unit 100' may be input.

The user may generate a touch signal on the display unit 100 by using a separate input device (not shown) or an input device (not shown) connected to the display unit 100, or may generate a touch signal by directly touching the display unit 100 by using a body part of the user. An example of the input device includes, but is not limited to, an electronic pen for generating an electrical signal when it contacts or approaches the touch panel.

The display unit 100 may include a display panel and a holder formed along edges of the display panel and not including a light emitting device, or may include only the display panel without including the holder. Hereinafter, one edge of the display unit 100 is referred to as a first edge 110, and another edge of the display unit 100 facing the first edge 110 is referred to as a second edge 120.

Referring back to FIG. 2, the determination unit 220 determines whether the at least two input signals are input to set an imaging area, based on a time when the input of the at least two input signals obtained from the signal obtaining unit 210 starts or ends.

For example, if the input of one of the at least two input signals starts within a first critical time after the input of the other of the at least two input signals ends, the determination unit 220 may determine that the at least two input signals are signals for controlling an imaging area. Hereinafter, the above condition is referred to as a first condition.

For example, in FIG. 4, if the input of the second input signal 212 starts within the first critical time after the input of the first input signal 211 ends, the determination unit 220 may determine that the first and second input signals 211 and 212 are signals for controlling an imaging area. Alternatively, if the input of the first input signal 211 starts within the first critical time after the input of the second input signal 212 ends, the determination unit 220 may determine that the first and second input signals 211 and 212 are signals for controlling an imaging area.

More specifically, as shown in FIG. 4, if the input of the first input signal 211 starts from a point 211B of the first edge 110, and ends at a point 211A of the first edge 110 after the input of the first input signal 211 passes through the intermediate point 211C, the end of the input of the first input signal 211 may refer to a time when the input of the first input signal 211 crosses the first edge 110 at the point 211A. The start of the input of the second input signal 212 may refer to a time when the input of the second input signal 212 passes through a point 212B of the second edge 120. If the input of the second input signal 212 starts at the point 212B within the first critical time after the input of the first input signal 211 ends at the point 211A, the determination unit 220 may determine that the first and second input signals 211 and 212 are signals for controlling an imaging area.

On the other hand, as shown in FIG. 4, if the input of the first input signal 211 starts from the intermediate point 211C and ends at the point 211A of the first edge 110, the end of the input of the first input signal 211 may refer to a time when the input of the first input signal 211 crosses the first edge 110 at the point 211A. The start of the input of the second input signal 212 may refer to a time when the input of the second signal 212 passes through the point 212B of the second edge 120. The input of the first input signal 211 may resume at the point 211B after the input of the second input signal 212 ends at a point 212A of the second edge 120. A time when the input of the first input signal 211 resumes at the point 211B may also be defined as a start of the input of the first input signal 211. Thus, if the input of the second input signal 212 starts at the point 212B within the first critical time after the input of the first input signal 211 ends at the point 211A, and/or if the input of the first input signal 211 resumes at the point 211B also within the first critical time after the input of the second input signal 212 ends at the point 212A, the determination unit 220 may determine that the first and second input signals 211 and 212 are signals for controlling an imaging area.

If the first critical time is extremely small, for example, the input of the second input signal 212 may start immediately after the input of the first input signal 211 ends. That is, the first and second input signals 211 and 212 may be continuously input.

As such, the determination unit 220 may prevent at least two input signals having no relevance from being misrecognized as signals for controlling an imaging area. Since the determination unit 220 is on standby for input of a next input signal only for the first critical time after an input of an input signal ends, and terminates a process after the first critical time has passed, the flexible display device 10 may be prevented from unnecessarily being on standby for an excessively long time.

As another example, if the input of both of the first and second input signals 211 and 212 ends within a second critical time, the determination unit 220 may determine that the first and second input signals 211 and 212 are signals for controlling an imaging area. Hereinafter, this condition is referred to as a second condition. As such, one closed loop formed by the first and second input signals 211 and 212 may be obtained within the second critical time. In other words, the second condition is a condition for restricting a total time for obtaining input signals. Since the If a time when input of one or a plurality of input signals starts excessively differs from a time when the input of the one or plurality of input signals ends, the second condition is a condition for determining that such input signals as signals are not controlling an imaging area. If input of all input signals ends within a certain restriction time according to the second condition, the determination unit 220 may determine such input signals are signals for controlling an imaging area.

As such, since the determination unit 220 terminates a process if a closed loop formed by input signals is not obtained within the second critical time, the flexible display device 10 may be prevented from unnecessarily being on standby for an excessively long time.

In some cases, the determination unit 220 may determine that input signals are signals for controlling an imaging area, if the input signals satisfy both of the first and second conditions. Alternatively, the determination unit 220 may determine that input signals are signals for controlling an imaging area, if the input signals satisfy one of the first and second conditions. Which one of the first and second conditions is used may be variously determined according to a situation where the current embodiment is implemented.

The imaging area control unit 230 illustrated in FIG. 2 may include an imaging area setting unit 231 and an output signal generation unit 232.

The imaging area setting unit 231 may set an internal area of the closed loop as the imaging area based on the at least two input signals obtained from the signal obtaining unit 210. Alternatively, if the determination unit 220 determines that the at least two input signals are signals for setting an imaging area, the imaging area setting unit 231 may set an internal area of the closed loop as an imaging area. Here, the imaging area may include a plurality of split imaging areas. For example, the imaging area may include a first imaging area and a second imaging area, which are split from each other.

Figure 5:
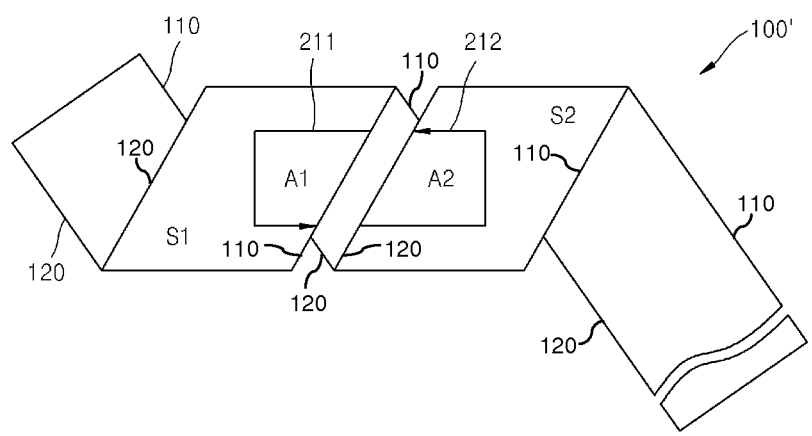
FIG. 5 is a diagram showing an imaging area setting unit setting an imaging area.

FIG. 5 is a diagram showing that the imaging area setting unit 231 sets an imaging area. Referring to FIG. 5, the imaging area setting unit 231 may set a first imaging area A1 based on the first input signal 211 and the first edge 110 of the display unit 100, and may set a second imaging area A2 based on the second input signal 212 and the second edge 120 of the display unit 100. For example, the imaging area setting unit 231 may set an internal area of a closed loop formed by the first input signal 211 and the first edge 110 of the display unit 100, as the first imaging area A1, and may set an internal area of a closed loop formed by the second input signal 212 and the second edge 120 of the display unit 100, as the second imaging area A2.

Referring to FIG. 5, the display unit 100 may include a display area for displaying an image, and the display area may include a first sub display area S1 and a second sub display area S2 spaced apart from each other on the display unit 100. The first and second input signals 211 and 212 may be input in response to a continuous touch on the display area.

The display area is an area viewable to a user when the flexible display device 10 is transformed, and the transformed flexible display device 10 may display an image on the display area. The user may input the first and second input signals 211 and 212 by inputting a touch signal on the display area for displaying an image while the flexible display device 10 is transformed. Also, the user may input the first and second input signals 211 and 212 by inputting a touch signal on the first and second sub display areas S1 and S2 while the flexible display device 10 is transformed.

The first input signal 211 may be input to one of the first and second sub display areas S1 and S2, and the second input signal 212 may be input to the other of the first and second sub display areas S1 and S2. As such, the first imaging area A1 may be included in one of the first and second sub display areas S1 and S2, and the second imaging area A2 may be included in the other of the first and second sub display areas S1 and S2.

For example, the first input signal 211 may be input to the first sub display area S1, and the second input signal 212 may be input to the second sub display area S2. In this case, the first imaging area A1 set based on the first input signal 211 and the first edge 110 may be included in the first sub display area S1, and the second imaging area A2 set based on the second input signal 212 and the second edge 120 may be included in the second sub display area S2.

Referring back to FIG. 2, the output signal generation unit 232 generates an output signal for displaying an image on the first and second imaging areas A1 and A2 set by the imaging area setting unit 231.

For example, the output signal generation unit 232 may generate the output signal by converting a coordinate for displaying the image, from a first coordinate where the image is already displayed to a second coordinate corresponding to the set imaging area. Alternatively, the output signal generation unit 232 may generate an output signal for displaying an image not yet displayed on the display area, at the second coordinate corresponding to the set imaging area.

If the imaging area includes a plurality of split imaging areas, the output signal generation unit 232 may generate the output signal by splitting the image to correspond to the split imaging areas. The split images may be viewed as one image when the display unit 100 is transformed.

During the output signal is generated, the output signal generation unit 232 may perform buffering by, for example, outputting a buffer screen on the display area such that the image is not displayed on the display area. If the output signal is completely generated, the output of the buffer screen may be terminated.

A display control unit 233 controls the display unit 100 to move and display the image displayed on the display area onto the set imaging area based on the output signal generated by the output signal generation unit 232 illustrated in FIG. 2.

If the buffer screen is output, the display control unit 233 may control the display unit 100 to terminate the output of the buffer screen and to display an image based on the output signal generated by the output signal generation unit 232.

In order to select an image to be moved and displayed, before the at least two input signals are input, an operation of, for example, touching an area of the image to be moved and displayed may be additionally performed. For example, if the user inputs an image to be moved and displayed by using, for example, a method of double clicking the image, and then inputs the at least two input signals, an image to be displayed on the imaging area set based on the at least two input signals may be selected. In addition to the method of double clicking an image to be moved and displayed, the user may select the image by using various input methods.

The display control unit 233 may control an image displayed on the display area to be moved and displayed onto the set imaging area, or may control an image not yet displayed on the display area to be displayed on the set imaging area. For example, if an image that is not yet displayed is to be displayed on the display area, the display control unit 233 may control the image to be displayed on the set imaging area.

Figure 6A:
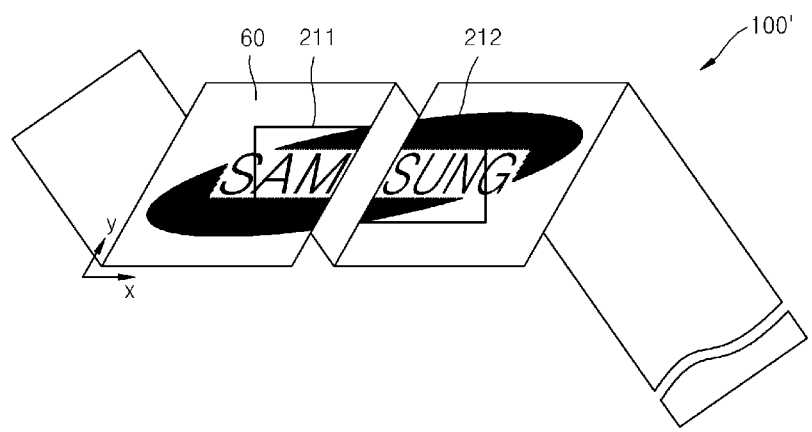
FIG. 6A is a diagram showing an image displayed on the modified display unit.

FIG. 6A is a diagram showing that an image 60 is displayed on the modified display unit 100'. Referring to FIG. 6A, the image 60 is displayed at a first coordinate (x-y) before input signals are input. To the modified display unit 100' illustrated in FIG. 6A, the first and second input signals 211 and 212 may be input in response to a continuous touch of a user.

If the determination unit 220 determines that the first and second input signals 211 and 212 are signals for controlling an imaging area, as illustrated in FIG. 6A, the imaging area setting unit 231 may set an internal area of a closed loop formed by the first and second input signals 211 and 212 input in response to a continuous touch of the user, as the imaging area.

Figure 6B:
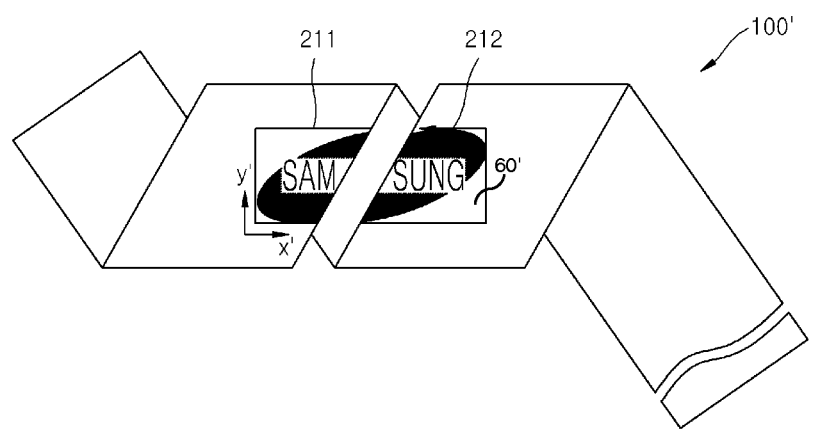
FIG. 6B is a diagram showing an image displayed on an imaging area set by the imaging area setting unit.

FIG. 6B is a diagram showing that an image is displayed on the imaging area set by the imaging area setting unit 231. Referring to FIG. 6B, the display control unit 233 may control the image 60 already displayed at the first coordinate (x-y) before the first and second input signals 211 and 212 are input, to be moved and displayed as an image 60' at a second coordinate (x'-y') corresponding to the imaging area set by the imaging area setting unit 231.

The first coordinate (x-y) where the image 60 is already displayed before the first and second input signals 211 and 212 are input is arbitrarily illustrated in FIG. 6A for convenience of explanation and is not limited the illustrated coordinate. The first coordinate (x-y) may be a coordinate corresponding to any area included in the display area. Also, the first coordinate (x-y) may be a coordinate corresponding to an area included in only a part of the display area.

Likewise, the second coordinate (x'-y') is also arbitrarily illustrated in FIG. 6B for convenience of explanation and is not limited the illustrated coordinate. The second coordinate (x'-y') may differently set according to the shape of an internal area of a closed loop formed by the first and second input signals 211 and 212.

Referring to FIGS. 6A and 6B, an angle between an x axis and a y axis of the first coordinate (x-y) of the image 60 illustrated in FIG. 6A and the angle between an x' axis and a y' axis of the second coordinate (x'-y') of the image illustrated in FIG. 6B may be different from each other. In this case, the output signal generation unit 232 may convert a coordinate for displaying an image, from the first coordinate to the second coordinate by using coordinate transition between coordinate systems having different scales and angles.

For example, the output signal generation unit 232 may calculate ratios of lengths between axes of the first and second coordinates, and may reduce or increase the image in size according to the calculated ratios. Alternatively, the output signal generation unit 232 may tilt the image based on angles between axes of the first and second coordinates. Referring to FIGS. 6A and 6B, since the angles between axes of the first and second coordinates are different from each other, if a coordinate for displaying an image is converted from the first coordinate to the second coordinate, the image may be tilted.

The first and second coordinates may include a plurality of split areas on a spread display according to the shape of an imaging area. As such, calculation for directly moving the image from the first coordinate to the second coordinate may not be easy.

In this case, initially, the output signal generation unit 232 may shift the first and second coordinates to an origin coordinate system by performing coordinate transformation. At each of the shifted first and second coordinates, a plurality of split imaging areas are connected to and continuously aligned with each other. After that, the output signal generation unit 232 may generate the output signal by converting the coordinate for displaying the image, from the shifted first coordinate where the image is already displayed, to the shifted second coordinate corresponding to the set imaging area.

The output signal generation unit 232 may calculate ratios of lengths between axes of the shifted first and second coordinates, and may reduce or increase the image in size according to the calculated ratios. Alternatively, the output signal generation unit 232 may tilt the image based on angles between axes of the shifted first and second coordinates.

If the output signal is generated by shifting the first and second coordinates, the output signal generation unit 232 may inversely move the shifted second coordinate to the original second coordinate by performing coordinate transformation and thus may generate an ultimate output signal for displaying the image at the original second coordinate.

Figure 7:
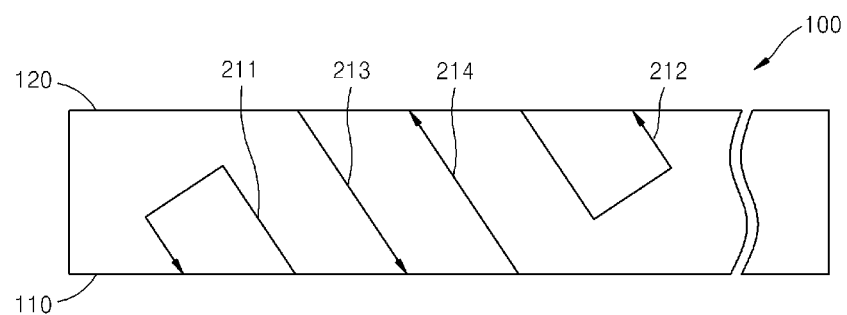
FIG. 7 is a diagram showing input signals input to a display unit, constructed as another embodiment according to the principles of the present invention.

FIG. 7 is a diagram showing input signals according to another embodiment of the present invention. Referring to FIG. 7, the signal obtaining unit 210 may obtain at least four input signals for setting an imaging area and input to the display unit 100 due to a continuous touch for forming a closed loop. The at least four input signals may include a first input signal 211, a second input signal 212, a third input signal 213, and a fourth input signal 214. The first through fourth input signals 211 through 214 may be drag signals input in response to a continuous touch of a user.

Each of the third and fourth input signals 213 and 214 may extend from one of the first edge 110 of the display unit 100 and the second edge 120 facing the first edge 110, to the other of the first and second edges 110 and 120, and may face the other. Referring to FIG. 7, the third input signal 213 extend from the second edge 120 to the first edge 110 of the display unit 100, and the fourth input signal 214 may extend the first edge 110 to the second edge 120 of the display unit 100.

Figure 8:
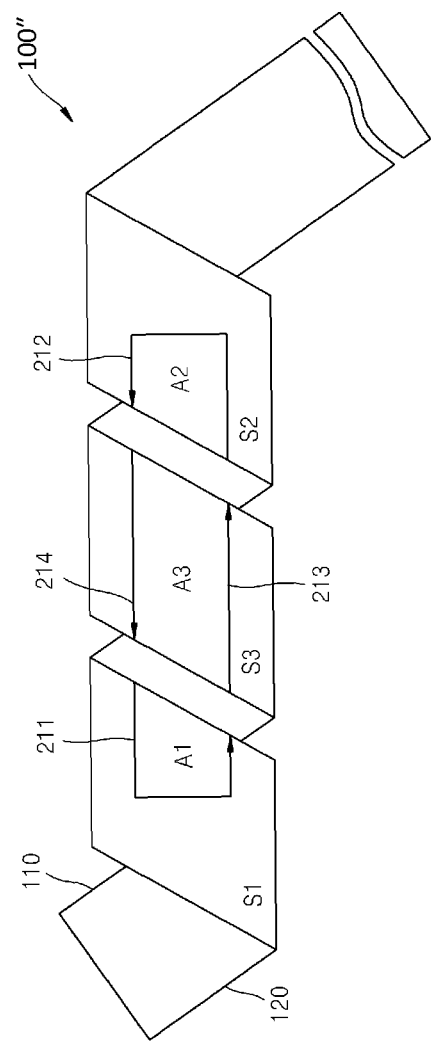
FIG. 8 is a diagram showing the input signals illustrated in FIG. 7 input a modified display unit.

FIG. 8 is a diagram showing the first through fourth input signals 211 through 214 illustrated in FIG. 7, together with the modified display unit 100". Referring to FIG. 8, the first through fourth input signals 211 through 214 may be continuously input due to a user's continuous touch for forming one closed loop on the modified display unit 100", and thus may form one closed loop on the modified display unit 100". In order to allow the first through fourth input signals 211 through 214 to form one closed loop on the modified display unit 100", the third and fourth input signals 213 and 214 may not cross and may face each other.

The continuous touch of the user may start at any point of one closed loop formed by the first through fourth input signals 211 through 214, and the closed loop may be completely formed if the touch returns to the start point.

As described above in relation to FIG. 2, if the input of one of the at least two input signals starts within the first critical time after the input of the other of the at least two input signals ends, the determination unit 220 may determine that the at least two input signals are signals for controlling an imaging area.

Referring to FIG. 8, the first through fourth input signals 211 through 214 may be input in an order of the first input signal 211, the third input signal 213, the second input signal 212, and the fourth input signal 214. In FIG. 8, for example, if the input of the third input signal 213 starts within the first critical time after the input of the first input signal 211 ends, the input of the second input signal 212 starts within the first critical time after the input of the third input signal 213 ends, and the input of the fourth input signal 214 starts within the first critical time after the input of the second input signal 212 ends, the determination unit 220 may determine that the first through fourth input signals 211 through 214 are signals for controlling an imaging area.

Although the input of the first through fourth input signals 211 through 214 starts and ends at a respective point of the first and second edges 110 and 120, the present invention may not limit to this. For example, similar to the embodiment shown in FIG. 4, the input of at least one of the first through fourth input signals 211 through 214 may start at an intermediate point located between the first and second edges 110 and 120 and end at the same intermediate point. Since the operation of the determination unit 229 is almost the same to the embodiment mentioned above, the operation of the determination unit 229 will not be repeated here.

If the first critical time is extremely small, for example, the input of the third input signal 213 may start immediately after the input of the first input signal 211 ends. That is, the first and third input signals 211 and 213 may be continuously input. In this manner, the input of the second input signal 212 may start immediately after the input of the third input signal 213 ends, and the input of the fourth input signal 214 may start immediately after the input of the second input signal 212 ends.

That is, the first, third, second, and fourth input signals 211, 213, 212, and 214 may be continuously input.

As such, the determination unit 220 may prevent at least four input signals having no relevance from being misrecognized as signals for controlling an imaging area. Since the determination unit 220 is on standby for input of a next input signal only for the first critical time after input of an input signal ends, and terminates a process after the first critical time is passed, the flexible display device 10 may be prevented from unnecessarily being on standby for an excessively long time.

As another example, if the input of all of the first through fourth input signals 211 through 214 ends within the second critical time, the determination unit 220 may determine that the first through fourth input signals 211 through 214 are signals for controlling an imaging area. As such, one closed loop formed by the first through fourth input signals 211 through 214 may be obtained within the second critical time. The above condition corresponds to the above-described second condition and is a condition for restricting a total time for obtaining input signals.

According to the second condition, if input of all input signals ends within a certain time limit, the determination unit 220 may determine such input signals as input signals for controlling an imaging area. As such, if a closed loop formed by input signals is not obtained within the second critical time, the determination unit 220 may terminate a process and thus the flexible display device 10 may be prevented from unnecessarily being on standby for an excessively long time.

According to a situation where the present invention is implemented, the determination unit 220 may determine that at least four input signals are signals for controlling an imaging area, if the at least four input signals satisfy both of the first and second conditions. Alternatively, the determination unit 220 may determine that at least four input signals are signals for controlling an imaging area, if the at least four input signals satisfy one of the first and second conditions. Which one of the first and second conditions is used may be variously determined according to a situation where the current embodiment is implemented.

The above-described order of inputting input signals is exemplarily provided, and the determination method of the determination unit 220 may differ according to the order of inputting the input signals and points where the input of the input signals starts and ends.

The imaging area setting unit 231 sets an internal area of a closed loop as the imaging area based on the at least four input signals obtained from the signal obtaining unit 210. Here, the imaging area may include a plurality of split imaging areas. For example, the imaging area may include a first imaging area, a second imaging area, and a third imaging area, which are split from each other.

Referring to FIG. 8, the imaging area setting unit 231 may set an internal area of a closed loop formed by the first through fourth input signals 211 through 214, as the imaging area based on the first through fourth input signals 211 through 214. The imaging area may include a first imaging area A1, a second imaging area A2, and a third imaging area A3, which are split from each other.

In more detail, the imaging area setting unit 231 may set an internal area of a closed loop formed by the first input signal 211 and the first edge 110 as the first imaging area A1, may set an internal area of a closed loop formed by the second input signal 212 and the second edge 120 as the second imaging area A2, and may set an internal area of a closed loop formed by the third input signal 213, the first edge 110, the fourth input signal 214, and the second edge 120 as the third imaging area A3.

The first through fourth input signals 211 through 214 illustrated in FIG. 8 may be input to a display area that is an area viewable to a user on the modified display unit 100". Specifically, each of the first through fourth input signals 211 through 214 may be input to one of sub display areas. For example, the first input signal 211 may be input to a first sub display area S1, the second input signal 212 may be input to a second sub display area S2, and the third and fourth input signals 213 and 214 may be input to a third sub display area S3.

As such, the first imaging area A1 set based on the first input signal 211 and the first edge 110 may be included in the first sub display area S1, the second imaging area A2 set based on the second input signal 212 and the second edge 120 may be included in the second sub display area S2, and the third imaging area A3 set based on the third input signal 213, the first edge 110, the fourth input signal 214, and the second edge 120 may be included in the third sub display area S3.

Shapes of the first through third imaging areas A1 through A3 are determined according to patterns of the closed loops formed by the first through fourth input signals 211 through 214. The first and second imaging areas A1 and A2 may have shapes of trapezoids, and the third imaging area A3 may have a shape of a parallelogram. The shapes of the first through third imaging areas A1 through A3 are not limited thereto and may be variously determined according to the patterns of the closed loops formed by the first through fourth input signals 211 through 214.

The output signal generation unit 232 generates an output signal for displaying an image on the first through third imaging areas A1 through A3 set by the imaging area setting unit 231. For example, the output signal generation unit 232 may generate the output signal by converting a coordinate for displaying the image, from a first coordinate where the image is already displayed to a second coordinate corresponding to the set imaging area.

The output signal generation unit 232 may split the image to display the split images on a plurality of split imaging areas. For example, the output signal generation unit 232 may generate an output signal for displaying the split images on the first through third imaging areas A1 through A3, and thus may generate the output signal for displaying the image on the whole imaging area including the first through third imaging areas A1 through A3. If the image is split and displayed on the split imaging areas as described above, calculation for directly moving the image from the first coordinate to the second coordinate may not be easy.

In this case, as described above, initially, the output signal generation unit 232 may shift the first and second coordinates to an origin coordinate system by performing coordinate transformation, and then may convert the coordinate for displaying the image. For example, in FIG. 8, the first through third imaging areas A1 through A3 may be connected to and continuously aligned with each other by shifting their coordinates.

The output signal generation unit 232 may calculate ratios of lengths between axes of the shifted first and second coordinates, and may reduce or increase the image in size according to the calculated ratios. Alternatively, the output signal generation unit 232 may tilt the image based on angles between axes of the shifted first and second coordinates.

If the output signal is generated by shifting the first and second coordinates, the output signal generation unit 232 may inversely move the shifted second coordinate to the original second coordinate by performing coordinate transformation and thus may generate an ultimate output signal for displaying the image at the original second coordinate.

The display control unit 233 controls the display unit 100 to move and display the image displayed on the display area onto the set imaging area based on the output signal generated by the output signal generation unit 232. For example, by the control of the display control unit 233, the display unit 100 may split and display the image on the first through third imaging areas A1 through A3 based on the output signal generated by the output signal generation unit 232.

The display control unit 233 may control an image displayed on the display area to be moved and displayed onto the set imaging area, or may control an image not yet displayed on the display area to be displayed on the set imaging area. For example, if an image that is not yet displayed is to be displayed on the display area, the display control unit 233 may control the image to be displayed on the set imaging area.

Figure 9:
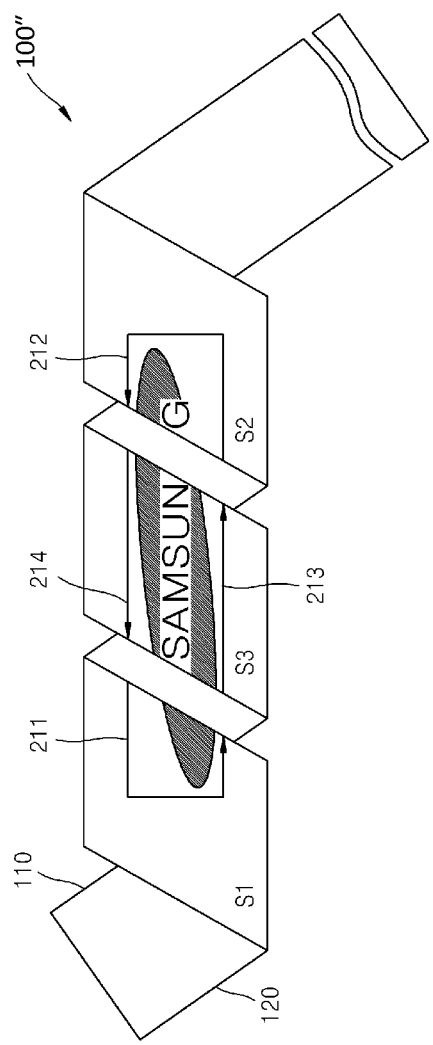
FIG. 9 is a diagram showing an image displayed on an imaging area illustrated in FIG. 8.

FIG. 9 is a diagram showing that an image is displayed on the imaging area illustrated in FIG. 8. Referring to FIG. 9, the display unit 100 may split and display the image on a plurality of imaging areas. For example, the display unit 100 may split and display the image on the first through third imaging areas A1 through A3 set based on the first through fourth input signals 211 through 214 and the first and second edges 110 and 120. The split and displayed images may be connected on the modified display unit 100" and thus may be viewed as one image.

Figure 10:
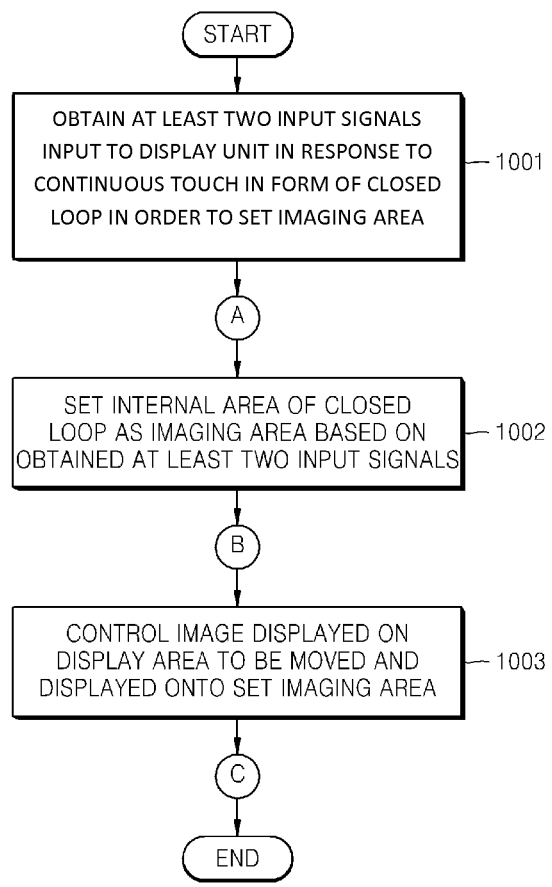
FIG. 10 is a flowchart of a method of setting an imaging area, constructed as an embodiment according to the principles of the present invention.

FIG. 10 is a flowchart of a method of setting an imaging area, constructed as an embodiment according to the principles of the present invention. Referring to FIG. 10, in operation 1001, the signal obtaining unit 210 obtains at least two input signals input to the display unit 100 in response to a continuous touch in the form of a closed loop in order to set an imaging area.

In operation 1002, the imaging area setting unit 231 sets an internal area of the closed loop as the imaging area based on the obtained at least two input signals.

In operation 1003, the display control unit 233 controls an image displayed on a display area to be moved and displayed onto the set imaging area.

Figure 11:
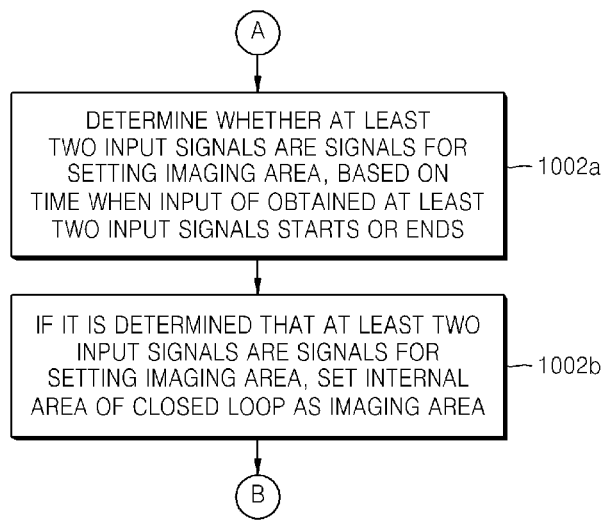
FIG. 11 is a flowchart of operation 1002 illustrated in FIG. 10.

FIG. 11 is a flowchart of operation 1002 illustrated in FIG. 10. Referring to FIG. 11, in operation 1002a, the determination unit 220 determines whether the at least two input signals are signals for setting an imaging area, based on a time when the input of the obtained at least two input signals starts or ends.

In operation 1002b, if it is determined that the at least two input signals are signals for setting an imaging area, the imaging area setting unit 231 sets an internal area of the closed loop as the imaging area.

Figure 12:
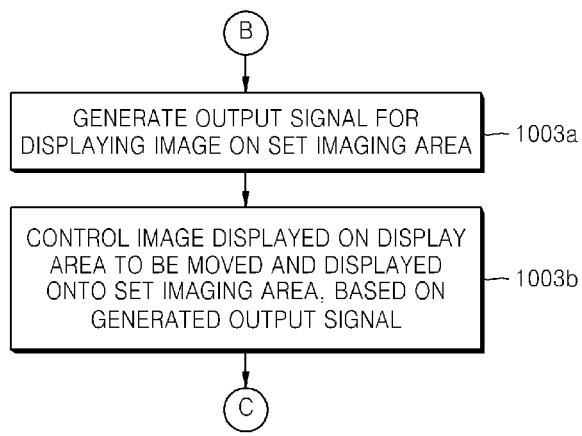
FIG. 12 is a flowchart of operation 1003 illustrated in FIG. 10.

FIG. 12 is a flowchart of operation 1003 illustrated in FIG. 10. Referring to FIG. 12, in operation 1003a, the output signal generation unit 232 generates an output signal for displaying the image on the set imaging area.

In operation 1003b, the display control unit 233 controls the image displayed on the display area to be moved and displayed onto the set imaging area, based on the generated output signal.

According to the above-described embodiments, an imaging area may be controlled appropriately for the shape of a flexible display device by using an input signal due to a user's touch. For example, by inputting the input signal due to the user's touch, the imaging area may be set appropriately for a transformed shape of the flexible display device. A spiral structure is described above as an example of the transformed shape but is not limited thereto.

Also, an image may be freely displayed according to various transformations intended by the user, and the imaging area may be instinctively controlled when the user directly inputs a touch signal onto a transformed display device. Furthermore, the imaging area may be controlled appropriately for various transformed structures of the flexible display device.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

Although an imaging area is split into two or three in the above description for convenience of explanation, the imaging area is not limited thereto and may be split into four or more according to a situation where the present invention is implemented. For example, the number of split imaging areas may differ according to a transformed shape of the display unit 100, or according to a part of a display area to which a user inputs an input signal.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of controlling a flexible display device, the method comprising:
controlling an imaging area within a display area of the flexible display device comprised of a display unit for receiving a manual touch, and a display area overlapping the display unit and displaying an image, by obtaining at least two input signals input to the display unit in response to a continuous manual touch in a form of a closed loop;
setting an internal area of the closed loop as the imaging area in accordance with the at least two input signals, the at least two input signals comprising a first input signal and a second input signal; and
controlling the image displayed on the display area to be moved and displayed onto the set imaging area, the imaging area comprising a first imaging area and a second imaging area spaced apart from each other on the display unit, and the setting of an internal area comprises setting the first imaging area on the a basis of the first input signal, and setting of the second imaging area on a basis of the second input signal, the display unit is flexible between the first imaging area and the second imaging area.

2. The method of claim 1, wherein the controlling the image further comprises generating an output signal for displaying the image on the set imaging area.

3. The method of claim 2, wherein the generating an output signal comprises generating the output signal by converting a coordinate for displaying the image, from a first coordinate where the image is displayed on a display area to a second coordinate corresponding to the set imaging area.

4. The method of claim 1, wherein the setting an internal area further comprises:
making a determination of whether the at least two input signals are signals for setting an imaging area based on a time when the input of the at least two input signals starts or ends; and
performing setting the internal area when the determination indicates that the at least two input signals are signals for setting an imaging area.

5. The method of claim 4, wherein the determination of whether the at least two input signals are signals for setting an imaging area comprises determining that the at least two input signals are signals for controlling an imaging area when the input of one of the at least two input signals starts within a first critical time after the input of the other of the at least two input signals ends.

6. The method of claim 1, wherein the flexible display device is transformable to a spiral structure, and the at least two input signals are continuously input to the display unit and form one closed loop on the transformed flexible display device.

7. The method of claim 1, wherein the setting an internal area comprises setting a first imaging area based on the first input signal and a first edge of the display unit, and setting the second imaging area based on the second input signal and a second edge of the display unit.

8. The method of claim 7, wherein the display area comprises sub display areas spaced apart from each other on the display unit, and the first imaging area is within one of the sub display areas and the second imaging area is within the other of the sub display areas.

9. The method of claim 7, wherein the at least two input signals further comprise a third input signal and a fourth input signal, and each of the third and fourth input signals extends between the first edge and the second edge facing the first edge and faces the other.

10. A computer readable recording medium having recorded thereon a computer program for executing the method of claim 1.

11. An apparatus for controlling an imaging area within a display area of a flexible display device comprised of:
a display unit disposed to respond operationally to reception of a manual touch, and
a display area of a flexible display device overlapping the display unit and displaying an image, the apparatus comprising:
a signal obtaining unit obtaining at least two input signals input to the display unit in response to a continuous manual touch in a form of a closed loop;
an imaging area setting unit setting an internal area of the closed loop as an imaging area in accordance with the at least two input signals, the at least two input signals comprise a first input signal and a second input signal; and
a display control unit controlling the image displayed on the display area to be moved and displayed onto the set imaging area, the imaging area comprises a first imaging area and a second imaging area spaced apart from each other on the display unit, and
the imaging area setting the first imaging area on a basis of the first input signal , and setting the second imaging area on a basis of the second input signal, the display unit is flexible between the first imaging area and the second imaging area.

12. The apparatus of claim 11, further comprising an output signal generation unit connected to the display control unit, the display control unit controlling the image to be displayed in response to an output signal provided by the output signal generation unit.

13. The apparatus of claim 12, wherein the output signal is generated by converting a coordinate for displaying the image, from a first coordinate where the image is displayed on the display area to a second coordinate corresponding to the set imaging area.

14. The apparatus of claim 11, further comprising a determination unit providing a determination of whether the at least two input signals are signals for setting an imaging area, based on a time when the input of the at least two input signals starts or ends, wherein the imaging area setting unit sets the internal area of the closed loop as the imaging area when the determination indicates that the at least two input signals are signals for setting an imaging area.

15. The apparatus of claim 14, wherein the determination unit determines that the at least two input signals are signals for controlling an imaging area when the input of one of the at least two input signals starts within a first critical time after the input of the other of the at least two input signals ends.

16. The apparatus of claim 11, wherein the flexible display device is transformable to a spiral structure, and the at least two input signals are continuously input to the display unit and form one closed loop on the transformed flexible display device.

17. The apparatus of claim 11, wherein the imaging area setting unit sets the first imaging area on the basis of the first input signal and a first edge of the display unit, and sets the second imaging area on the basis of the second input signal and a second edge of the display unit.

18. The apparatus of claim 17, wherein the display area comprises sub display areas spaced apart from each other on the display unit, and the first imaging area is within one of the sub display areas and the second imaging area is within the other of the sub display areas.

19. The apparatus of claim 17, wherein the at least two input signals further comprise a third input signal and a fourth input signal, and each of the third and fourth input signals extends between the first edge and the second edge facing the first edge and faces the other.

* * * * *